April 18, 1967
R. H. COOK ETAL
3,315,147
ELECTROMECHANICAL CURRENT SENSING APPARATUS FOR USE WITH
HIGH VOLTAGE ELECTRIC POWER TRANSMISSION CONDUCTORS
Filed April 30, 1963
4 Sheets-Sheet 1
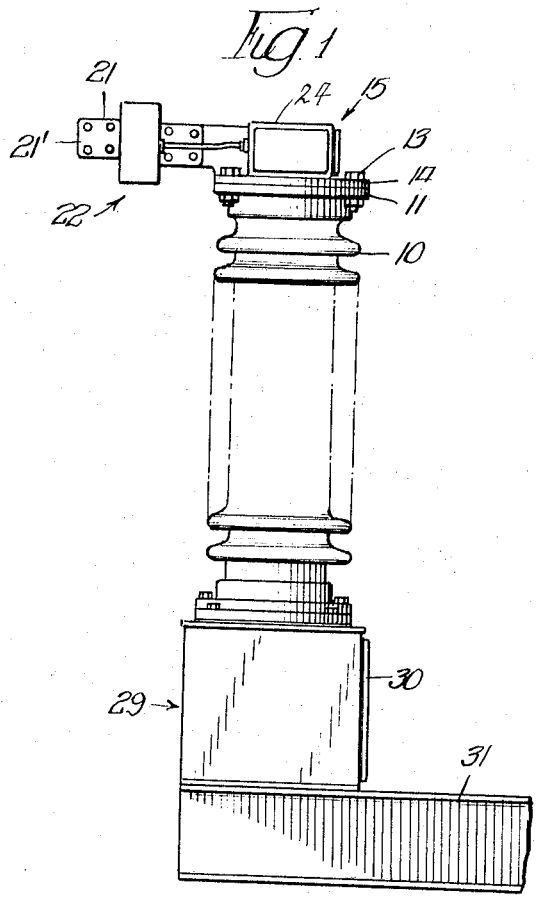
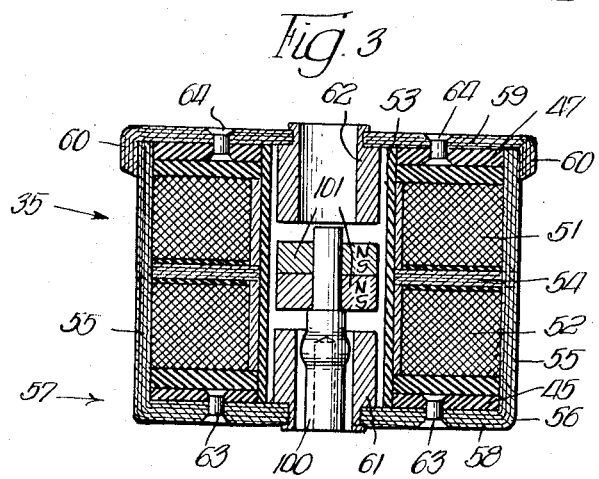
INVENTORS
Ralph H. Cook,
BY John S. Ferguson,
Robert R. Lockwood
atty

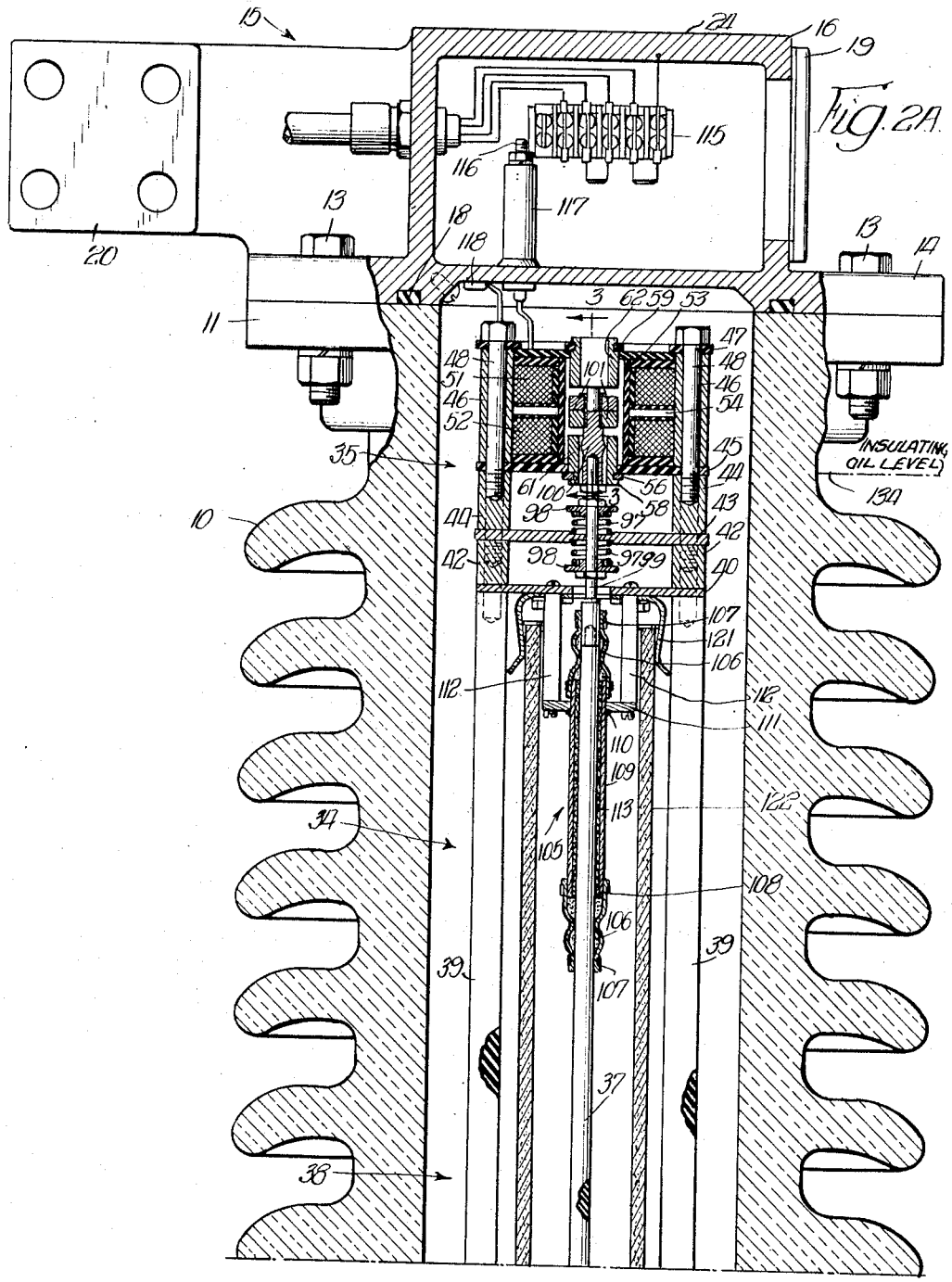

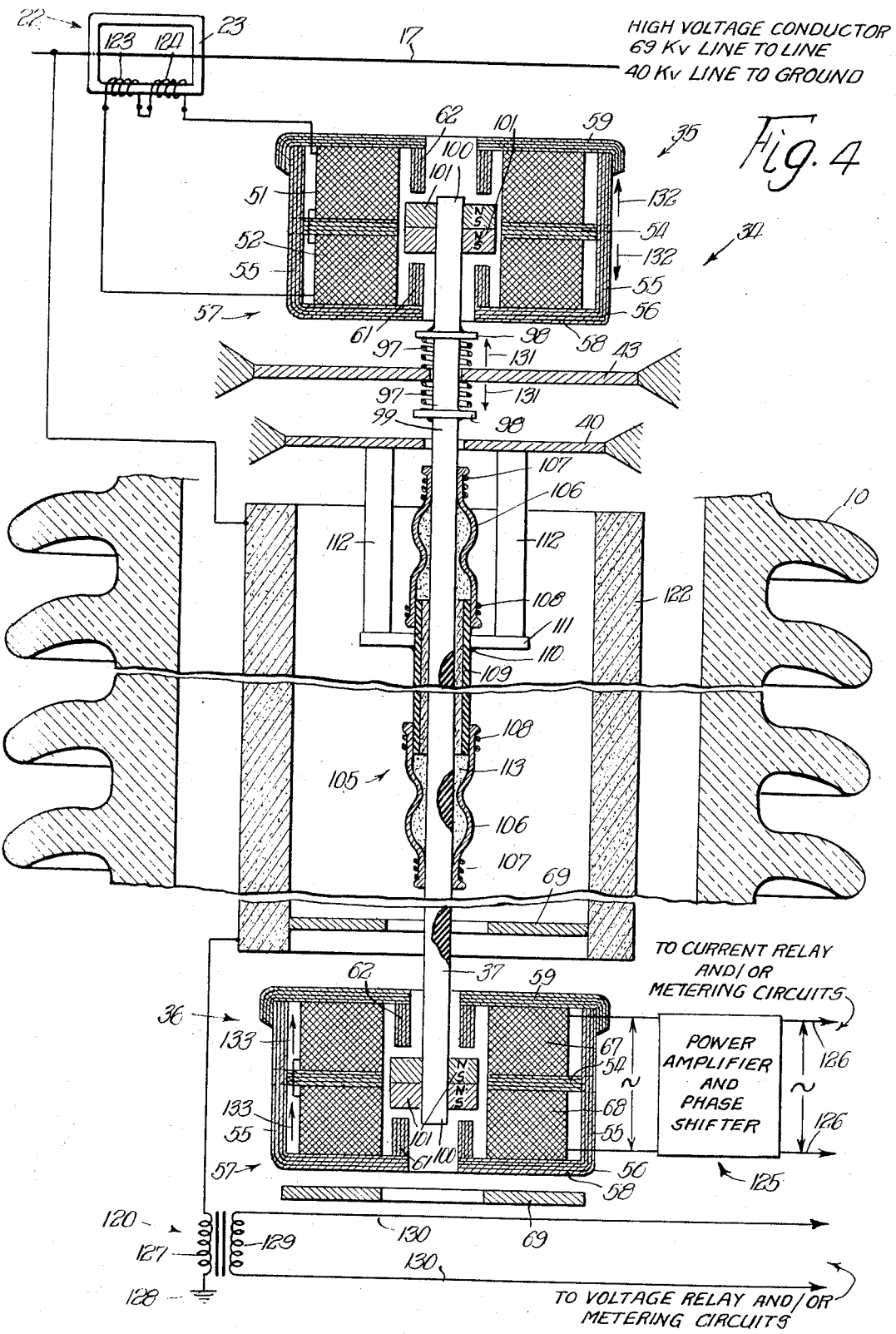

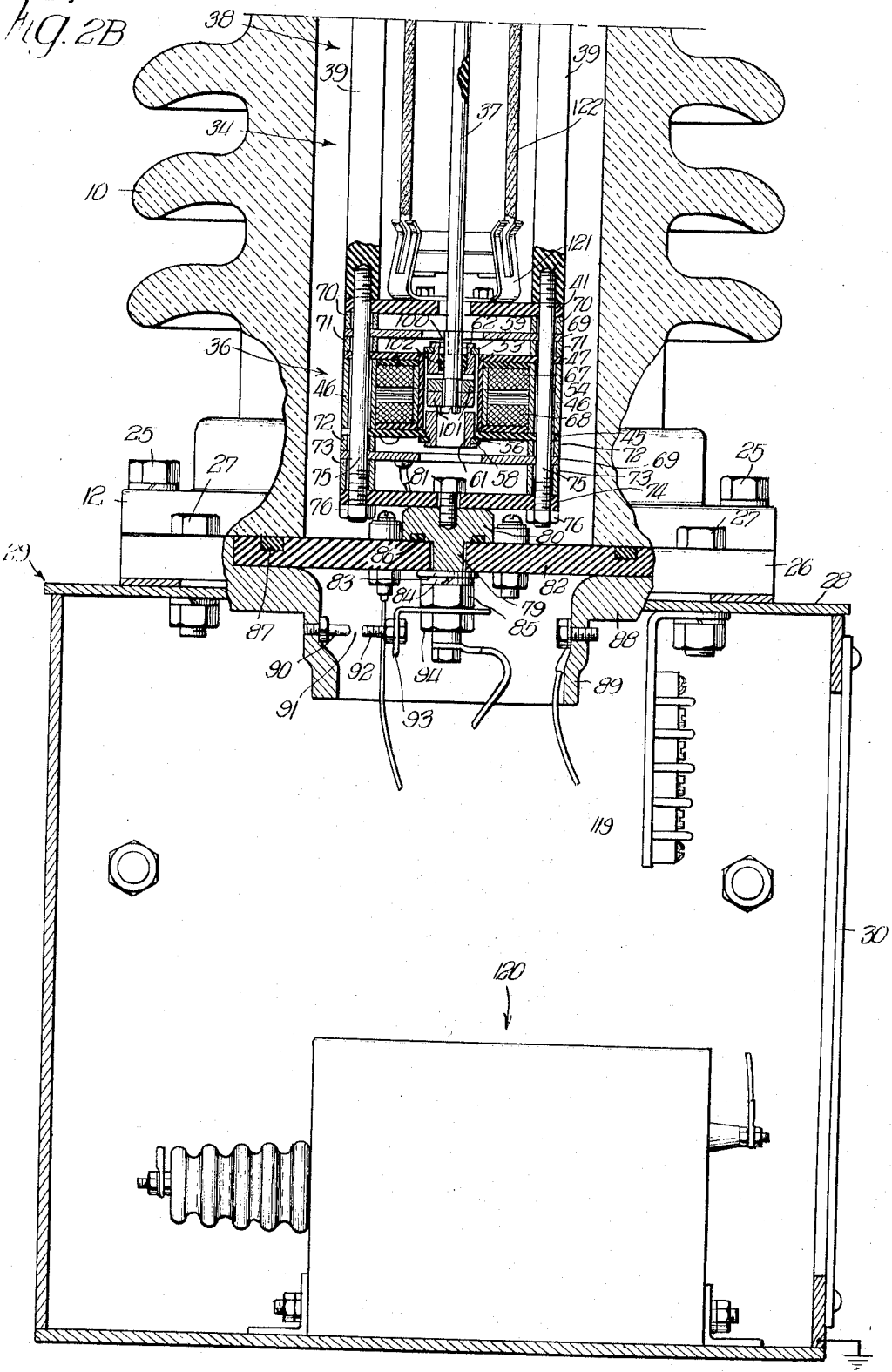

United States Patent Office 3,315,147
Patented Apr. 18, 1967

3,315,147
ELECTROMECHANICAL CURRENT SENSING APPARATUS FOR USE WITH HIGH VOLTAGE ELECTRIC POWER TRANSMISSION CONDUCTORS
Ralph H. Cook, Royal Oak, Mich., and John S. Ferguson, Glenview, Ill., assignors to S & C Electric Company, Chicago, Ill., a corporation of Delaware
Filed Apr. 30, 1963, Ser. No. 276,900
6 Claims. (Cl. 322—3)

This invention relates, generally, to electrical apparatus for use with high voltage electric power transmission conductors and it has particular relation to electromechanical current sensing devices with and without means for sensing the potential of the conductor. This invention is an improvement over the invention disclosed in application Ser. No. 205,602, filed June 27, 1962, in the name of Ralph H. Cook and assigned to the assignee of this application, now Patent No. 3,227,925, issued Jan. 4, 1966.

Among the objects of this invention are: To provide in a new and improved manner for sensing the alternating current flow in a conductor energized at a relatively high voltage of the order of 69 kv. and above and for generating at a lower voltage, such as at ground potential, an alternating current flow that corresponds in frequency and magnitude to the alternating current flow in the conductor in order to operate current responsive relays and/or to indicate the magnitude of the current flow in the conductors; to interconnect mechanically and insulatingly two transducers, one operating at the potential of the conductor and energized in accordance with the current flow therein, and the other generating an alternating voltage whose frequency and magnitude correspond to the frequency and magnitude of the alternating current flow in the conductor; to arrange the movable elements of the transducers and the connecting means therebetween to have a natural frequency of oscillation that is substantially higher than the frequency of the alternating current in the conductor, i.e., 60 cycles per second, and other than an integral multiple thereof; to dampen the oscillations of the moving system particularly when the current flow in the alternating current conductor is initiated and when it ceases; to bias the moving system to a predetermined position with respect to which it oscillates under the control of the current flow in the conductor; to position the transducers in the ends of an upstanding hollow insulator with the transducer that is energized in accordance with the current flow in the high voltage conductor being located at the upper end of the insulator while the other transducer is located at the lower grounded end; to employ for each transducer a permanent magnet armature and a winding surrounded by a magnetic circuit; to sub-divide each winding into two coils or windings cooperating in push-pull relation with the respective permanent magnet armature; to mount the transducers on an insulating frame, thereby providing a unitary structure insertable endwise into the hollow insulator; to shield magnetically the winding of the transducer at the lower end of the insulator from stray magnetic fields; to seal the ends of the hollow insulator and to immerse the transducers in an insulating fluid; and to provide in the insulator a resistor having a relatively high resistance for connection at its upper end to the conductor and to provide between its lower end and ground a measure of the voltage of the conductor.

In the drawings:

FIG. 1 is a view, in side elevation, of a hollow vertical insulator in which the transducers of the present invention are mounted, the arrangement being shown corresponding to the arrangement illustrated in the application above referred to and arranged, for example, to support one end of the circuit interrupter which is connected to a line terminal with the construction being arranged for mounting on a channel base corresponding to the channel base shown in the above application. The construction can be employed as a bus bar support independently of the circuit interrupter.

FIGS. 2A and 2B, taken together with the former being placed above the latter, show a vertical cross sectional view through the hollow insulator illustrated in FIG. 1 and depict the details of construction of the electromechanical current sensing device embodying the present invention.

FIG. 3 is a vertical sectional view at an enlarged scale taken generally along the line 3—3 of FIG. 2A and shows certain details of construction of the upper transducer.

FIG. 4 is a view that is partly in vertical section and partly diagrammatic and shows the electrical connections that are employed in practicing the present invention.

Referring now particularly to FIGS. 1 and 2A of the drawings, it will be noted that the reference character 10 designates a hollow insulator that may be formed of porcelain and is provided with external corrugations to increase the surface leakage distance thereover. An upper metallic fitting 11 is secured in conventional manner to the upper end of the insulator 10 and in a like manner a lower fitting 12 is secured to its lower end, it being shown in more detail in FIG. 2B. Bolts 13 serve to secure the upper metallic fitting 11 to a bottom plate 14 of a line terminal that is indicated, generally, at 15. The line terminal 15 includes a housing section 16 the purpose of which will be described hereinafter. It will be understood that the line terminal 15 constitutes a portion of a high voltage conductor which is illustrated, diagrammatically, at 17 in FIG. 4. In order to provide a seal between the metallic fitting 11 and the bottom plate 14, the latter is provided with an annular groove for receiving an O ring 18. A cover plate 19 is employed for closing one opening to the housing section 16. Formed integrally with the line terminal 15 is a terminal pad 20 to which a bus bar 21 is arranged to be bolted. The bus bar 21 is relatively short and constitutes a single turn primary winding of a low voltage current transformer 22 that is shown diagrammatically in FIG. 4. As there shown, the single turn primary winding is represented by conductor 17 which is surrounded by a magnetic circuit 23 on which secondary windings (to be described) are provided in order to measure the current flow through the bus bar 21 or through the conductor 17. At its outer end the bus bar 21 has a terminal pad 21' to facilitate connection thereto of a line conductor.

The line terminal 15 has a flat upper surface 24 one purpose of which is to receive one switch terminal of a circuit interrupter that is shown in the application above referred to. Also this construction can be used to support a bus bar in which current flow is to be measured. Since the present invention is directed to the details of construction of the electromechanical transducer mounted within the hollow insulator 10 and to the elements associated therewith, no description is set forth herein as to the details of construction of the circuit interruper. Moreover, other circuit interrupters can be employed in lieu of the particular circuit interrupter disclosed in the application above referred to for effecting interruption of the circuit represented by the conductor 17.

As seen in FIG. 2B the lower metallic fitting 12 is secured by bolts 25 to an annular support plate 26 which, in turn, is secured by bolts 27 to a top wall 28 of a metallic housing, indicated generally at 29, which serves as a support base for the hollow insulator 10 and the parts mounted therein. A cover plate 30 provides access to the interior of the metallic housing 29 which, as shown in FIG. 1, is arranged to be mounted on a base 31 that may be a rolled steel channel section as described in the application above referred to.

It is desirable to have a measure of the current flow in the high voltage conductor 17 in order to obtain an indication of the magnitude of the current flow therethrough. In addition it is desirable to measure the current flow particularly under fault current conditions in order that suitable operations can be initiated for opening the circuit including the conductor 17 by the operation of a circuit breaker or load interrupter switch of the kind and character referred to in the application above noted. It has been conventional to obtain a measure of the current flow in the conductor 17 through the use of a current transformer having a magnetic core surrounding the conductor which then functions as a single turn primary winding with the magnetic core being provided with a secondary winding which is connected to current responsive devices such as meters, relays and the like. Since the secondary winding of the current transformer is connected to energize the meters, relays and the like which are located at ground potential, it is essential that there be sufficient electrical insulation between the secondary winding and the conductor 17 in order to withstand the potential at which the latter is energized. The amount of insulation required increases as the potential of the conductor 17 increases with the result that the use of a conventional current transformer for this purpose becomes increasingly expensive as the potential of the conductor 17 is increased.

In accordance with this invention an electromechanical device or transducer, indicated generally at 34, is positioned within the hollow insulator 10. Since it is necessary to provide insulation between the line terminal 15 or the conductor 17 and ground, advantage is taken of the hollow insulator 10 for mounting therein the electromechanical transducer 34 which includes an upper or first transducer 35 and a lower or second transducer 36 with an insulating member or transmitter rod 37 mechanically interconnecting them. It will be understood that the upper or first transducer 35, which is located at the upper end of the hollow insulator 10, is energized at the potential of the line terminal 15 or of the conductor 17. Since this is the case, it is unnecessary to provide insulation for the upper or first transducer 35 with respect to the line terminal 15 of the kind and character that would be required if it were located at ground potential. On the other hand, since the lower or second transducer 36 is positioned at the lower end of the hollow insulator 10 and immediately adjacent the metallic housing 29 which operates at ground potential, it is unnecessary to provide high voltage insulation therebetween. The transducers 35 and 36 are insulated from each other since, as indicated, they are located at opposite ends of the hollow insulator 10 and are interconnected mechanically only by the insulating member or transmitter rod 37 and also by an insulating frame that is indicated, generally, at 38.

The insulating frame 38 extends upwardly through the interior of the hollow insulator 10 and comprises insulating rods 39—39 which are supported entirely from the lower end. They are interconnected at their upper ends by a metallic clip support plate 40 and at their lower ends by an insulating clip support plate 41. At the upper end spacer studs 42—42 are threaded into the upper ends of the insulating rods 39—39 and act to hold them rigidly to the metallic clip support plate 40. In addition the spacer studs 42—42 space the plate 40 from a metallic spring support plate 43. The plate 43 is secured by spacer studs 44—44 to the spacer studs 42—42 and thus they clamp the support plate 43 securely therebetween. A bottom insulating plate 45 is spaced above the support plate 43 by the spacer studs 44—44. Tubular spacers 46—46 function to space a top insulating plate 47 above the bottom insulating plate 45 and bolts 48—48 extend therethrough for the purpose of securing the assembly to the spacer studs 44—44. In this manner the upper or first transducer 35, which is energized at the potential of the conductor 17, is rigidly mounted by the insulating frame 38 at the upper end of the hollow insulator 10.

The construction of the upper and lower transducers 35 and 36 is generally the same. Accordingly, except where they are particularly different, a description of the construction of one will suffice for both. The transducer 35 is illustrated at a relatively small scale in FIG. 2A and at a larger scale in FIG. 3 where the section is taken at right angles to the section as shown in the former figure. The transducer 35 employs an upper coil 51 and a lower coil 52 which are connected in series circuit relation with the turns being wound oppositely in order that on series energization of the coils 51 and 52, they generate magnetic fields in opposite directions for the purpose of providing a push-pull effect in a manner to be described and so that voltages induced by stray magnetic fields will be opposed and therefore will be cancelled out. For illustrative purposes it is pointed out that each of the coils 51 and 52 comprises seventy-two turns of #14 gauge copper wire. However, it will be understood that other numbers of turns and sizes of conductor can be employed. The coils 51 and 52 are mounted on an insulating sleeve 53 intermediate the ends of which intermediate laminations 54 extend radially outwardly so as to be positioned between the juxtaposed sides of the coils 51 and 52. The ends of the intermediate laminations 54 are located adjacent arms 55—55 of C-shaped laminations 56 which form a part of the magnetic circuit, shown generally at 57, which surrounds the upper and lower coils 51 and 52. The C-shaped laminations 56 have a flat bottom 58. Their upper ends are interconnected by a top connecting yoke 59 of laminations having downturned ends 60—60 which overlie the upper ends of the arms 55—55. Preferably the several laminations are formed of silicon steel in order to minimize losses. A lower magnetic bushing 61 extends upwardly from the flat bottom 58 of the C-shaped laminations 56 and a similar upper magnetic bushing 62 depends from the central portion of the top connecting yoke 59. The purpose of the magnetic bushings 61 and 62 is to provide symmetrical air gaps to the intermediate laminations 54. In order to secure the flat bottom 58 of the C-shaped laminations 56 to the bottom insulating plate 45, rivets 63—63 are employed. In a similar manner rivets 64—64 serve to secure the top connecting yoke 59 of laminations to the top insulating plate 47.

Thus far the stator portion of the upper transducer 35 has been described. The stator portion for the lower transducer 36 is of the same general construction except that the upper and lower coils 67 and 68, while connected in series circuit and push-pull relationship for the same reasons as set forth above, comprise a larger number of turns of smaller diameter wire. For illustrative purposes it is pointed out that each of the coils 67 and 68, shown in FIGS. 2B and 4 comprise 1500 turns of #30 gauge copper wire.

There are certain other differences in the construction and mounting of the stator for the lower transducer 36. In order to shield the coils 67 and 68 from the effects of extraneous magnetic fields, magnetic shield plates 69—69 are provided above and below the coils 67 and 68. Spacers 70—70 serve to locate the upper magnetic shield plate 69 in predetermined relation below the insulating clip support plate 41. Additional spacers 71—71 function to space the upper magnetic shield plate 69 from the top insulating plate 47 of the stator for the lower transducer 36. As before the tubular spacers 46—46 are employed for maintaining the insulating plates 45 and 47 in spaced relation. Spacers 72—72 are located between the under side of the bottom insulating plate 45 and the top side of the lower magnetic shield 69. Additional spacers 73—73 are located between the underside of the lower magnetic shield plate 69 and the upper side of an insulating end plate 74. Threaded studs 75—75 extend through the several spacers and plates and at their upper ends are threaded, as illustrated, into the lower ends of the insulating rods 39—39. Nuts 76—76 threaded onto the lower ends of the studs 75—75 serve to hold the entire assembly in position.

Located centrally below the insulating end plate 74 is a bottom treminal stud 79 which has a head 80 into which a bolt 81 is threaded for securing the plate 74 in position. The bottom terminal stud 79 extends through a central aperture in an insulating plate 82 and is held in position thereon through clamping force transmitted through a flat washer 83 and a lock washer 84 by a clamp nut 85. An O ring 86 provides a seal between the under surface of the head 80 of the terminal stud 79 and the upper surface of the insulating plate 82. It will be observed that the insulating frame 38 carrying the transducers 35 and 36 at its upper and lower ends is unitarily mounted by the bottom terminal stub 79 on the insulating plate 82. The entire assembly is insertable into the hollow insulator 10 from its lower end as a unit and can be withdrawn therefrom in like manner. In order to provide a seal between the insulator plate 82 and the lower end of the hollow insulator 10 against which it bears an O ring 87 is employed.

When the insulating plate 82 is in operative position it is located between the lower end of the hollow insulator 10 and the upper surface of an annular flange 88 that extends inwardly from the annular support plate 26, as described above, is mounted on the top wall 28 of the metallic housing 29. The annular flange 88 is provided with an integral depending flange 89 which carries an electrode 90. It will be understood that the metallic housing 29 and thereby the support plate 26 is grounded with the result that the electrode 90 is at ground potential. A spark gap 91 is provided between it and electrode 92 which is carried by a metallic clip 93 that is connected to the lower end of the terminal studs 79 and is clamped thereto by a clamp nut 94.

It is desirable that the insulating member or transmitter rod 37 be biased to a predetermined position and under accurately controlled conditions. For this purpose, as shown in FIGS. 2A and 4, coil compression springs 97—97 are positioned above and below the spring support plate 43. At their upper and lower ends the springs 97—97 bear against spring retainers 98—98 that are secured to a transmitter rod extension 99 of nonmagnetic material such as brass. It will be understood that the springs 97—97 react against the transmitter rod extension 99 and thereby against the insulating member or transmitter rod 37 with predetermined forces which tend to neutralize each other to the end that the insulating member or transmitter rod 37 is biased to a predetermined position when the upper or first transducer 35 is not energized. Any movement of the insulating member or transmitting rod 37 from the initial or at rest position is accompanied by a transfer of energy from one spring 97 to the other as the case may be.

Secured rigidly to the upper end of the transmitter rod extension 99 is a magnet coupling member 100 that is formed of non-magnetic material such as brass A pair of annular permanent magnets 101—101 is rigidly secured to the upper end of the magnet coupling member 100 and they are arranged in series with the polarities as indicated in FIG. 4. For convenience two permanent magnets 101—101 are shown. However, it will be understood that a single permanent magnet can be employed, if desired.

It will be noted that the springs 97—97 are located closely adjacent to the upper or first transducer 35. The reason for this arrangement is to reduce to a minimum the length of the transmitter rod extension 99 which is subject to compression and elongation caused by the forces exerted thereon by the permanent magnets 101—101 and the springs 97—97. Thus the total amount of elongation and compression of the extension 99 can be minimized to avoid introduction of an element of distortion in the generated output voltage of the lower or second transducer 36.

It will be observed that the oscillatory movement of the transmitter rod 37 and parts rigidly secured thereto is guided by the springs 97—97 at the upper end. At its lower end the transmitter rod 37 is provided with a magnet coupling member 100 which is guided in a bushing 102 of suitable plastic material such as Teflon. Permanent magnets 101—101 are secured to the magnet coupling member 100 at the lower end of the transmitter rod 37. When the upper transducer 35 is not energized, the springs 97—97 function to bias the transmitter rod 37 to a predetermined position, as above noted. In this position the permanent magnets 101—101 associated with the upper and lower transducers 35 and 36 respectively are positioned symmetrically with respect to the intermediate laminations 54 and with respect to the facing ends of the magnetic bushings 61 and 62.

As pointed out above, the natural frequency of oscillation of the moving parts of the transducers 35 and 36 and the interconnecting transmitter rod 37 is arranged to be substantially greater—and other than a whole multiple of—the frequency of the current flow in the conductor 17 (which may be assumed to be 60 cycles per second) in order to provide acceptable transient response, avoid over-emphasis of any harmonic content in the current in conductor 17, and avoid any significant response to mechanical vibrations to which the apparatus may be subjected, which in power stations are typically at whole multiples of the 60 cycle power frequency.

For proper operation of current responsive relays, it is necessary that the sensor system, and hence also the motion of the transmitter rod 37 and parts of the transducers 35 and 36 rigidly secured thereto, follow fairly closely the alternations of current flow in the conductor 17. When current starts to flow in the conductor 17 on closure of the circuit, or suddenly increases in amplitude on inception of a fault in the circuit of the conductor 17, the movement of the transmitter rod 37 and parts of the transducers 35 and 36 rigidly secured thereto should not substantially "overshoot," that is, it should not exceed substantially an excursion which is proportional to the current flowing in the conductor 17. Additionally, on cessation of flow of current in the conductor 17, it is necessary, in order to prevent false tripping of relays, particularly sensitively-adjusted residual or ground relays, that any continued free oscillatory movement of the transmitter rod 37 and parts of the transducers 35 and 36 rigidly secured thereto be damped out as rapidly as practicable, preferably rapidly enough so that the amplitude of oscillation has decayed to 50% or less in 8.3 milliseconds (one-half cycle on 60-cycle-per-second basis). In order to secure these operating conditions viscous fluid damping means, shown generally at 105, is provided and is associated with the transmitter rod 37. For this purpose flexible boots 106—106 of silicone rubber are secured in opposed relation to the lower end of the transmitter extension rod 99 and to the transmitter rod 37 as shown in FIGS. 2A and 4. Suitable cementing and binding means 107—107 secure the flexible boots 106—106 to the transmitter rod extension 99 and the transmitter rod 37 respectively. Similar cementing and binding means 108—108 secure the other ends of the flexible boots 106—106 to the respective ends of a tube 109 of insulation through which the transmitter rod 37 extends. The tube 109 is held against movement and for this purpose it is cemented as indicated at 110 to the underside of a metal plate 111 which is rigidly mounted by support studs 112—112 to the under side of the metallic clip support plate 40. The space between the inner surfaces of the flexible boots 106—106 including the inner surface of the tube 109 and the outer surface of the transmitter rod 37 is filled with a damping fluid 113 having a minimal viscosity variation within the ambient temperature range to which the equipment is likely to be subjected.

Since a certain amount of variation in viscosity, and therefore in damping action, of the fluid with temperature must be contended with, it is important to select a type and formulation of damping fluid, and thus a range for this variation, which will have the least effect, over the expected temperature range, on the amplitude and phase relations between current in the conductor 17 and movement of the transmitter rod 37 and parts of the transducers 35 and 36 rigidly secured thereto, consistent with achievement of the desired amount of damping as described above. A filling 113 consisting of a commercially available silicone fluid having a viscosity of 30,000 centistokes at 75° F. was found to dampen free oscillations to approximately 30% in 8.3 milliseconds at 160° F., to 20% in 8.3 milliseconds at 75° F., and to 10% in 8.3 milliseconds at −20° F. With the same filling, the output voltage of the transducer 36 was found to be proportional to the current in the conductor 17 within plus-or-minus 7.5% over the temperature range −20° F. to 160° F., and, for this temperature range, to be in fixed phase relation with the current in the conductor within plus-or-minus 6.5 electrical degrees.

As shown in FIG. 2A the housing section 16 of the line terminal 15 has mounted therein a terminal block 115 to facilitate making connections to the windings on the magnetic circuit 22 of the current transformer. In addition there is provided a terminal bolt 116 that extends through an upstanding insulator 117 from the bottom wall of the housing section 16. This arrangement serves to make one connection to the series connected coils 51 and 52 of the upper transducer 35, the other terminal being connected at 118 to the line terminal 15.

FIG. 2B shows the metallic housing 29 as having mounted therein a terminal block 119 to facilitate connections to the various elements contained within the hollow insulator 10. Also enclosed within the metallic housing 29 is a potential transformer that is indicated, generally, at 120. The connections to the potential transformer 120 will be described presently.

It is desirable that a measure of the potential of the line terminal 15 or the conductor 17 with respect to ground be provided at ground potential. For this purpose resistor mounting clips 121—121 are mounted on the under side of the clip support plate 40 and the upper side of the clip support plate 41 respectively. A tubular resistor 122 has its ends extending into the mounting clips 121—121 and thus it is supported concentrically within the hollow insulator 10 with the transmitter rod 37 extending along its vertical axis and spaced therefrom. The tubular resistor 122 is formed of suitable high resistance ceramic material and its length and the material are controlled by the potential of the line terminal 15 or conductor 17 with respect to ground. Other configurations than tubular for the resistor 122 can be employed, if desired.

For illustrative purposes it is pointed out that when the potential between the line terminal 15 and ground is 40 kv. the tubular resistor 142 preferably has a resistance of 10 megohms. It will be understood that the application of the tubular resistor 122 to the resistor mounting clips 121—121 is a part of the sequence of steps employed in assembling the complete electromechanical transducer 34.

Referring now particularly to the circuit diagram shown in FIG. 4, it will be observed that the magnetic core 23 for the current transformer 22 has the conductor 117 extending therethrough so that it functions as a single turn primary winding. Secondary windings 123 and 124 are located on the magnetic core 23. Preferably they are separately wound and the number of turns on each is different. For example the winding 123 may have 150 turns while the winding 124 has 100 turns around the magnetic circuit 23. This makes it possible to obtain various current ratios depending upon the expected current flow in the conductor 17. For example, the secondary windings 123 and 124 can be connected in series circuit relation as shown in FIG. 4. This arrangement provides the maximum current ratio. Lower ratios can be obtained by employing either one or the other of the windings 123 or 124 or by connecting them in opposition rather than in series.

It will be understood that the lower transducer 36 functions as a generator to reproduce in its output circuit the current flow in the conductor 17. Since its output is relatively small, it is connected to a power amplifier and phase shifter that is indicated, generally, at 125 in order to apply to conductors 126—126 a current flow that is truly representative in magnitude and phase of the magnitude and phase of the current flow in the conductor 17. It will be understood that the conductors 126—126 are connected to conventional metering and relaying circuits that are employed in a power station for indicating the current flow in a conductor and for controlling the operation of circuit interrupters and like equipment in the event that fault current should flow in the conductor 17.

It will be observed in FIG. 4 that the potential transformer 120 includes a primary winding 127 that is connected to the lower end of the tubular resistor 122 the upper end of which is connected to the conductor 17. The other terminal of the primary winding 127 is connected to ground at 128. Thus the voltage applied to the winding 127 is a function of the voltage between the conductor 17 and ground as indicated at 128. Inductively related to the primary winding 127 is a secondary winding 129 which is arranged to energize conductors 130—130 that are connected to suitable potential measuring equipment such as meters, relays and the like in accordance with conventional practice.

When the system is deenergized, or when no current is flowing in the conductor 17, the forces exerted on the transmitter rod 37 and parts movable therewith by the springs 97—97 are as indicated by oppositely directed arrows 131—131. The forces are equal and opposite and, under the assumed conditions, the movable system is at rest.

Upon energization of the conductor 17 by a flow of alternating current a corresponding flow of alternating current takes place in the secondary windings 123 and 124 or one of them, depending upon how they are connected, and through the series connected upper and lower coils 51 and 52 of the upper transducer 35. It will be recalled that the coils 51 and 52 are wound oppositely with the result that their magnetic fields are generated in opposite directions and can be represented by the oppositely directed arrows 132—132. The reaction between the magnetic fields thus generated and the magnetic fields from the permanent magnets 101—101 results first in simultaneous attraction of the permanent magnets 101—101 toward upper magnetic bushing 62 and repulsion from lower magnetic bushing 61, followed, when the alternating current in coils 51 and 52 reverses in direction, by repulsion of the permanent magnets 101—101 from upper magnetic bushing 62 and attraction toward lower magnetic bushing 61. Thus the permanent magnets 101—101 are subject to a combination of two forces corresponding in magnitude and direction to the current flowing in coils 51 and 52, and hence cause the transmitter rod 37 to be oscillated at the frequency of the alternating current flow in the conductor 17 against the biasing actions of the springs 97—97 with the magnitude of the oscillations being a function of the magnitude of the current flow in each half cycle of the alternating current. Since the permanent magnets 101—101 which comprise the armature of the lower transducer 36 are moved in corresponding fashion, there is a corresponding induction of flux in the magnetic circuit 57 associated with the coils 67 and 68. As a result voltages are induced in these coils which may be represented by the arrows 133—133 to the end that a voltage is applied to the input end of the power amplifier and phase shifter 125 which is a function of the magnitude of the current flow in the conductor 17.

In order to provide additional insulation between the upper and lower ends of the hollow insulator 10, the interior thereof can be filled with a suitable insulating liquid to the level indicated by the broken line 134 in FIG. 2A. Since the excursions of the transmitter rod 37 and parts rigid therewith are relatively small, the fact that they are immersed in an insulating liquid does not materially affect their operation. Instead of an insulating liquid, the hollow insulator 10 can be filled with an insulating gas, such as $SF_6$, to provide the required insulation.

What is claimed as new is:

1. An electromechanical device for sensing alternating current flow in a high voltage conductor and reproducing it at ground potential comprising:
    (a) a hollow upstanding insulator adapted to receive the high voltage conductor at its upper end while its lower end is grounded,
    (b) a first transducer at the upper end of said insulator connected for energization in response to current flow through said conductor and for oscillatory movement in synchronism with the frequency of the alternating current with the displacements being a function of the magnitude of the current flow in succeeding half cycles,
    (c) a second transducer at the lower end of said insulator,
    (d) an insulating member extending through said insulator and rigidly interconnecting the moving elements of said transducers whereby said second transducer generates an alternating current the magnitude and frequency of which correspond to the magnitude and frequency of the alternating current flow in said conductor, and
    (e) each transducer including:
        (1) a permanent magnet structure fast on said insulating connecting member, and
        (2) two coils having the respective magnet structure centrally located with respect thereto and connected in push-pull relation with respect to the magnetic field thereof.

2. An electromechanical device for sensing alternating current flow in a high voltage conductor and reproducing it at ground potential comprising:
    (a) a hollow upstanding insulator adapted to receive the high voltage conductor at its upper end while its lower end is grounded,
    (b) a first transducer at the upper end of said insulator connected for energization in response to current flow through said conductor and for oscillatory movement in synchronism with the frequency of the alternating current with the displacements being a function of the magnitude of the current flow in succeeding half cycles,
    (c) a second transducer at the lower end of said insulator,
    (d) an insulating member extending through said insulator and rigidly interconnecting the moving elements of said transducers whereby said second transducer generates an alternating current the magnitude and frequency of which correspond to the magnitude and frequency of the alternating current flow in said conductor,
    (e) each transducer including
        (1) a winding,
        (2) a magnetic circuit surrounding said winding, and
        (3) a permanent magnet armature fast on the insulating connecting member,
    (f) an insulating frame extending through said insulator and holding said transducers at its ends in rigid spaced relation, and
    (g) spring means reacting against said frame and biasing said insulating connecting member and armatures to a predetermined position about which they are oscillated on energization of the winding of the first transducer.

3. The invention, as set forth in claim 2, wherein damping means react between said insulating connecting member and said frame to dampen the oscillations of the former with respect to the position to which it is biased by said spring means.

4. The invention, as set forth in claim 3, wherein said spring means and said damping means are disposed adjacent said first transducer and remote from said second transducer.

5. An electromechanical device for sensing alternating current flow in a high voltage conductor and reproducing it at ground potential comprising:
    (a) a hollow upstanding insulator adapted to receive the high voltage conductor at its upper end while its lower end is grounded,
    (b) a first transducer at the upper end of said insulator connected for energization in response to current flow through said conductor and for oscillatory movement in synchronism with the frequency of the alternating current with the displacements being a function of the magnitude of the current flow in succeeding half cycles,
    (c) a second transducer at the lower end of said insulator,
    (d) an insulating member extending through said insulator and rigidly interconnecting the moving elements of said transducers whereby said second transducer generates an alternating current the magnitude and frequency of which correspond to the magnitude and frequency of the alternating current flow in said conductor,
    (e) each transducer including
        (1) a winding,
        (2) a magnetic circuit surrounding said winding, and
        (3) a permanent magnet armature fast on the insulating connecting member, and
    (f) magnetic shields disposed above and below the winding of said second transducer to reduce induction therein of voltages by stray magnetic fields.

6. The invention, as set forth in claim 5, wherein a tubular resistor having a relatively high resistance is telescoped over said insulating connecting member and is adapted to be connected at its upper end to said high voltage conductor to provide between its lower end and ground a measure of the potential of said conductor with respect to ground.

References Cited by the Examiner

UNITED STATES PATENTS

| 2,769,103 | 10/1956 | Kristiansen | 310—30 |
| 3,227,925 | 1/1966 | Cook | 317—58 |

FOREIGN PATENTS

| 1,084,828 | 7/1960 | Germany. |
| 1,118,347 | 11/1961 | Germany. |

MILTON O. HIRSHFIELD, *Primary Examiner.*

J. J. SWARTZ, *Assistant Examiner.*